United States Patent [19]
Clark

[11] 3,992,219
[45] Nov. 16, 1976

[54] ZINC AND MANGANESE PIGMENTS

[75] Inventor: David William Harold Clark, Monkwood, England

[73] Assignee: May & Baker Limited, Essex, England

[22] Filed: June 20, 1974

[21] Appl. No.: 481,231

Related U.S. Application Data

[63] Continuation-in-part of Ser. No. 194,616, Nov. 1, 1971, abandoned.

[30] Foreign Application Priority Data

June 10, 1974 United Kingdom............... 25674/74

[52] U.S. Cl. .............................. 106/291; 106/293; 106/296; 106/288 B
[51] Int. Cl.² .......................................... C09C 1/04
[58] Field of Search ........... 106/291, 292, 293, 296, 106/308 B, 288 B

[56] References Cited
UNITED STATES PATENTS 2,251,869  8/1941  Gamble et al. .................. 106/296
2,769,716  11/1956  Rankin ............................ 106/15

OTHER PUBLICATIONS

"Comprehensive Treatise on Inorganic and Theoretical Chemistry" vol. 4 Mellor 1946 pp. 659–661.
"Nouveau Traite de Chemie Minerale" vol. 5 Pascal 1962 p. 162.

Primary Examiner—Patrick P. Garvin
Assistant Examiner—J. V. Howard
Attorney, Agent, or Firm—Stevens, Davis, Miller & Mosher

[57] ABSTRACT

A zinc or manganese salt in the form of essentially plate-like particles is subjected to a sulphiding or, in the case of a zinc salt, an oxiding treatment, giving multi-layer structures where the treatment is partial or a single layer structure where the treatment is substantially complete. This treatment has the effect of increasing the refractive index of the particles without altering the plate-like shape of the particles. The treated particles are thus suitable for use as nacreous pigments.

20 Claims, 4 Drawing Figures

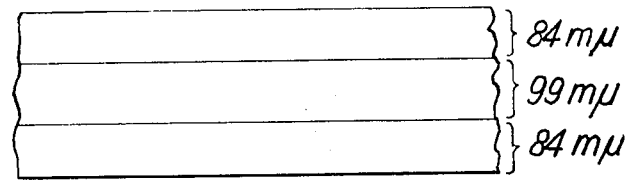
*Fig. I.*
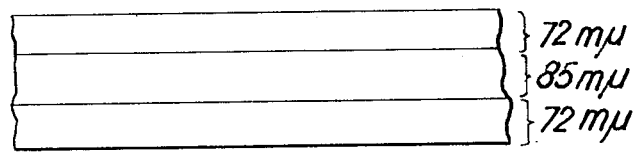
*Fig. II.*
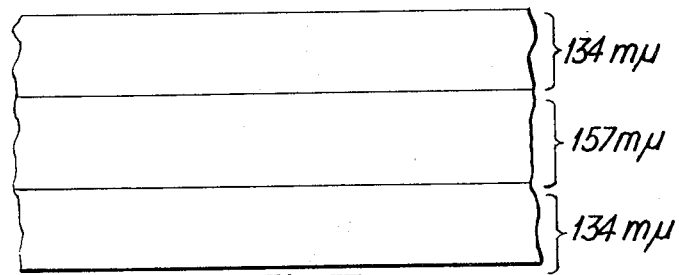
*Fig. III.*
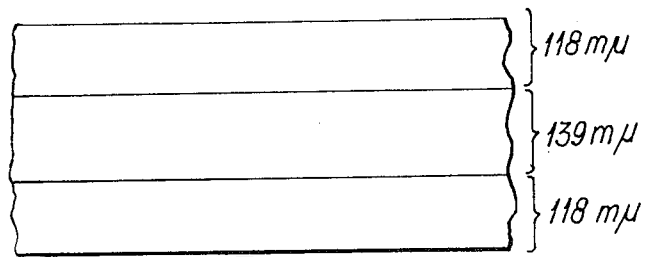
*Fig. IV.*

ZINC AND MANGANESE PIGMENTS

This application is a continuation-in-part application of my application Ser. No. 194,616, filed Nov. 1, 1971 now abandoned.

This invention relates to pigments of a nacreous character and their production.

One of the most satisfactory nacreous pigments (or pearling agents) is natural pearl essence, the naturally occurring form of guanine which can be obtained from fish scales. Unfortunately, however, this substance is difficult to isolate and thus very costly. Artificial nacreous pigments have in general suffered from one or other of the defects of being insufficiently pearlescent or too toxic for general use. Ideally, a nacreous pigment should not only be inherently pearlescent but, in addition, have a high refractive index, good stability to heat and light, chemical unreactivity, and lack of toxicity. Because of their high refractive index, compounds of bismuth and lead such as bismuth oxychloride and lead subcarbonate have been used on a very large scale as pearling agents but they do not satisfactorily fulfil all the above criteria. Thus, the bismuth compounds discolour on exposure to light, those of lead are toxic, and both are prone to sulphur staining. Consequently, there is a need for pearling agents which can be produced in a relatively simple manner and which do not suffer from these defects.

Zinc compounds do not suffer from the aforesaid defects of the bismuth and lead compounds and are, in general, cheaper than the former. Attempts have in consequence been made to produce zinc compounds useful as pearling agents. One of these, hydrated zinc orthophosphate, has an attractive appearance and can, under certain conditions, be produced in the form of thin plates, which give it suitable reflecting properties. However, it has only a relatively low refractive index about 1.61 to 1.63, and, for this reason, the use of hydrated zinc orthophosphate as a pearling agent has never given rise to a commercially satisfactory product.

According to the present invention there is provided a zinc or manganese salt in the form of essentially planar or plate-like particles containing, apart from the ion of the salt, sulphide and/or, in the case of zinc salts, oxide ions. Generally the amount of sulphide ions introduced is from about 1 to about 32 to 33% by weight, preferably from about 2 to about 20% by weight for "multi-layer" pigments (as discussed below) and about 20 to about 32 to 33% by weight for "single layer" pigments (as discussed below). The amount of oxide ion introduced is from about 1 to about 19 to 19.6% by weight, preferably from about 2 to about 12% by weight.

It has been found that the incorporation of sulphide, and/or, in the case of zinc, oxide ions, into a zinc or manganese salt having the desired physical shape gives rise to a product which is eminently suitable for use as a pearling agent. As is well known, zinc sulphide possesses a very high refractive index but no method has heretofore been devised for producing this compound by crystallisation from a solution in a form suitable for use as a pearling agent. It has now been found that by incorporating sulphide or oxide ions into a zinc salt having the desired physical shape it is possible to produce zinc sulphide or oxide having the form of the original salt. If only some of the original anions are replaced by the sulphide and/or oxide ions a "multi-layer" pigment will be obtained. If, on the other hand, there is approaching complete replacement a "single layer" pigment is obtained. Generally, zinc orthophosphate and its hydrates have a refractive index of 1.55 to 1.65, more particularly 1.61 to 1.63. The sulphide material formed will vary in refractive index generally from 1.75 to 2.3 (zinc) and from 1.65 to 2.7 (manganese) depending on the extent of replacement of phosphate ions by sulphide ions. Zinc oxide layers will generally have a refractive index from 1.65 to 2.0.

Typical salts having the desired planar structure which may be used in this invention and which are very sparingly soluble in water include the various phosphates of zinc and manganese as well as basic salts of zinc, such as basic zinc nitrate, zinc sulphate, zinc chloride and zinc bromide, which is the preferred basic zinc salt. The preferred salt for use in the present invention is zinc orthophosphate $Zn_3(PO_4)_2xH_2O$ where $x =$ 0 to 8. This material can be obtained by mixing a solution of a zinc salt with a hot, suitably about 90° to 97° C., solution of a water-soluble (containing at least ½% w/v as $PO_4$) phosphate e.g. an alkali metal or ammonium phosphate optionally containing an anionic surface active agent to modify the crystal size and shape, and then cooling. Manganese orthophosphate can also be used, but zinc salts are preferred since they are white whereas the manganese salts are usually pink and therefore usually less desirable.

The basic zinc salts which may be used as templates in the present invention can generally be prepared by boiling the zinc salt with water and adding thereto either zinc oxide or, preferably, an alkali metal hydroxide such as sodium hydroxide. The hot solution is filtered if necessary to remove undissolved starting material and then cooled whereupon the resulting precipitate of basic zinc salt can be filtered off. Suitably the aqueous solution contains 1 to 5 moles of zinc salt per liter. If zinc oxide is used then an amount from 0.25 to 0.5 moles per litre is suitably introduced; although the use of larger quantities would increase the quantity of basic salt produced it is advisable to use larger quantities since this tends to cause precipitation of zinc oxide with the basic salt. Such difficulties can generally be avoided by using an alkali metal hydroxide. The hydroxide should be used in an amount to produce a flocculent precipitate, for example from 1/40 to 1/10 mole/liter. Once the alkali metal hydroxide has been added the mixture can either be boiled and cooled or, alternatively, the boiled solution can be added to excess water to cool the solution. Which cooling procedure is adopted depends largely on the particle size required; generally smaller crystals can be obtained using the latter procedure.

Generally although the various zinc salts can be prepared in the form of plates whose lengths can range from under 1μ to over 2 mm across, the length/thickness ratio of the crystals is usually in the region of 10 to 50:1, for example with the various hydrates of zinc orthophosphate the length/thickness of the crystals is usually in the region of 20:1, i.e. a crystal of suitable length and breadth, typically 20μ × 5μ, will have a thickness of 1μ and with basic zinc salts a crystal of suitable length and breadth, typically 20μ × 20μ, will have a thickness of 0.4 to 2μ. Preferred thicknesses for single layer crystals of zinc and manganese salts according to the present invention are 50 or 60–100mμ and 100–600mμ for multilayer crystals. For maximum lustre and pearlescent effect a crystal of refractive index 1.62 to 1.66 should have a thickness of approximately 100mµ and therefore a length/thickness ratio of 200:1. Crystals whose length/thickness ratio lie in the range 15 to 1000:1, preferably 40 to 400:1, especially 100 to 400:1 can be utilised in the present invention. Naturally, these dimensions apply equally to the starting material and to the final product.

For true pearling agents, the size of the crystals (and the zinc and manganese salt starting materials) should generally be from 1 to 100 microns across, preferably from 5 to 50 microns across. If material having a sparkling decorative appearance is required as opposed to material for strictly nacreous finishes, then larger particle sizes of the order of up to 1 to 2 millimeters in diameter are desirable. If the smaller particles are required, one method of achieving this is to incorporate a suitable anionic surface active agent into the reaction mixture. This method has the advantage of producing a product of greater pearliness due to the reduction in crystal thickness mentioned previously. It is also possible to reduce the size of the crystals, for example in the case of zinc orthophosphate by increasing the quantity of ammonia or other alkali used in the preparation, i.e. by increasing the pH of the reaction slightly. The pH of the suspension should however be in the range of 2 to 4 if suitable sized particles are to be obtained. However, although the particle size of the zinc orthophosphate crystals made by this latter method is more favourable, the product tends to result in a less satisfactory pearling agent because of its low length/thickness ratio with the result that the finished particles do not "flow" as well as thinner particles of higher length/thickness ratio.

Again, crystal size can be controlled to some extent by altering the rate of cooling of the solution after the addition of the zinc (when zinc crystals are being prepared) salt. Generally by increasing the rate of cooling, smaller crystals are obtained. In the case of zinc orthophosphate, if small crystals are required cooling should be carried out in no more than 3 to 4 minutes. Smaller zinc orthophosphate crystals, which may give rise to an enhanced pearly effect, can be produced by cooling the suspension to room temperature in less than two minutes. In order to facilitate the cooling it is desirable to operate the preparation of the zinc salt on a continuous basis by mixing fine streams of the reactants hot and then cooling them, for example, by passing through a narrow tube immersed in an ice/salt mixture before passing them through a filter. By this means, only small amounts of reactants have to be cooled at any one time and this, naturally, increases the efficiency of the cooling. If the cooling is not rapid, crystals of the order of 30 – 500 microns across and approximately 200 millimicrons thick are obtained. Crystals of zinc orthophosphate of the order of 30 – 100 microns across and about 175 millimicrons thick can be obtained if the cooling is performed in about 4 minutes; if cooling is performed in about 2 minutes the particle size is generally about 50 microns. If the cooling is rapid a length/thickness ratio of about 20:1 is obtained; with slow cooling ratios up to about 100:1 can be obtained but, of course, the crystals are generally too large. It is also possible to reduce the crystal size by incorporating gelatin or, preferably, ethyl alcohol into the reaction mixture. This procedure is reasonably effective but has the disadvantage that alcohol becomes trapped or absorbed into/onto the crystal with the result that when the crystal is subsequently treated with sulphide solution the alcohol is converted into an evil smelling organic sulphur compound which is very difficult to remove.

However, it has been found that the use of an anionic surface-active agent is generally the most satisfactory. For zinc orthophosphate, anionic surface-active agents such as the sulphosuccinates typified by Manoxol OT and N are especially suitable; other suitable surface-active agents include the alkylbenzene sulphonates, such as sodium dodecylbenzene sulphonate. The incorporation of such substances into the reaction solution at a concentration of 0.005 to 0.25% w/v of the total solution, preferably 0.0125 to 0.125% w/v results in the length/thickness ratio of the crystals being improved up to 200:1 depending on the concentration of surface active agent used. The effect of the additive is to reduce all the crystal dimensions including length and breadth, but the growth in thickness of the crystals is inhibited to a much greater extent, thus resulting in a more favourable length/thickness ratio. Thus under specified conditions zinc orthophosphate crystals can be obtained with crystal lengths in the region of 100 – 250µ and a maximum length-thickness ratio of 100:1, but by incorporation of a suitable quantity of an anionic surface-active agent into the preparation crystals of length 20 – 30µ and length/thickness ratio of 200:1 can be obtained.

Crystals of zinc orthophosphate which have been prepared in the presence of an anionic surface active agent aggregate badly when transferred into plain water. Consequently the product from such a source should be washed free from impurities and stored in a solution containing surface active agent of similar type and concentration to that used in the preparation. In common with other high quality pearling agents irreversible aggregation occurs if the zinc salt is dried, so that this product, and the sulphided material made from this product, should be handled as a paste in aqueous surface-active agent solution, or in an organic solvent or plasticiser. Aggregates, both of the template material and of the sulphided products, can, however, generally be broken down using conventional procedures, such as ultrasonic vibration or a colloid mill.

It is to be understood that the salts referred to above are exemplary only and that other zinc and manganese salts forming essentially planar particles can be used.

According to an embodiment of the present invention, there is provided a process for the preparation of the pigments of the present invention which comprises treating planar or plate-like particles of a zinc or manganese salt, for example in an aqueous medium, with sulphide or hydrosulphide ($HS^-$) ions, optionally in the presence of a suitable anionic surface active agent, and, optionally, calcining the product in the presence of oxygen. The resulting particles may then be separated from the reaction mixture, washed and dried or transferred to an organic liquid.

The preferred embodiments of the process will now be discussed using hydrated zinc orthophosphate, typically of formula $Zn_3(PO_4)_2 \cdot 4H_2O$, by way of example. The zinc orthophosphate is preferably obtained by adding phosphoric acid, followed by ammonia solution, to hot water, optionally containing a suitable anionic surface-active agent, generally at a concentration of 0.005 to 0.25% w/v of the total solution, preferably at a concentration of 0.0125 to 0.125% w/v, at about 90° to 97° C., with brisk stirring; the temperature of the solution is then raised to, for example, about 97° C., and a solution of zinc chloride in water is added. The suspension of zinc orthophosphate so produced, optionally after being held at an elevated temperature for, for example, about 2 hours, is then cooled to room temperature with continuous stirring.

In order to introduce the sulphide ions into the resulting hydrated zinc orthophosphate crystals, the crystals may be resuspended, optionally in the presence of an anionic surface active agent, and sulphide or hydrosulphide ions added thereto. Reaction times of the order of 10 minutes to 6 hours are generally suitable, more particularly from 10 minutes to 2 hours for "multilayer" pigments and from 2 to 6 hours for "single layer" pigments, using temperatures from for example, 10° to 70° C. The use of higher temperatures will, naturally, reduce the reaction time. The product is filtered and then washed thoroughly with water or an aqueous solution of a suitable anionic surface active agent. The pigment may then be stored as a paste wet with water or a suitable organic solvent or plasticiser. Alternatively the pigments, made from zinc orthophosphate prepared in the absence of a surface active agent, may be dried, e.g. by heating at 110° C, and the product stored as a dry powder (i.e. in the absence of liquid). The product may also be dried by washing with a water-miscible organic solvent, for example an alcohol, e.g. isopropanol, or a ketone, e.g. acetone, but if this procedure is adopted with an oxygenated organic compound it is preferable to allow the product to stand for some time, e.g. some days, before drying since the freshly-prepared product tends to react with oxygenated organic compounds to give evil smelling sulphur compounds similar to those mentioned above when gelatin or ethyl alcohol is used in the preparation of the hydrated zinc orthophosphate crystals.

The preferred salt for introducing the sulphide ions is sodium sulphide but it will be appreciated that other salts including ammonium sulphide or sodium hydrosulphide can be used for this purpose. Sodium sulphide nonahydrate is available commercially as colourless crystals and can be stored readily. In contrast, ammonium sulphide is generally obtained as a yellow solution which tends to impart unwanted colour into the product. The length of time the crystals are allowed to remain in the sulphide solution does, of course, have an important bearing on the amount of sulphide ions incorporated in the salt. When ammonium sulphide is used, the reaction conditions need to be controlled fairly carefully since otherwise disintegration of the crystals can occur and this, naturally, decreases the lustre and pearliness of the product. Solutions of sodium sulphide, on the other hand, can be used in the reaction over a wide range of conditions without the characteristic shape or lustre of the zinc template being destroyed. Attempts to effect complete replacement of anion by sulphide in zinc salt crystals whose thicknesses are above 250 m$\mu$ generally fail because of a general weakening in the crystal structure causing a loss of the desirable plate-like shape. However zinc salt crystals below about 250 m$\mu$ in thickness, for example zinc orthophosphate crystals prepared in the presence of an anionic surface active agent, can be reacted with sulphide ions until the pigment contains negligble anion, i.e. the zinc salt crystal has been converted to a form of zinc sulphide with the same form as the original crystal to give a "single layer" structure. In general the white pigment, in which the crystal thickness is below 250 m$\mu$ and phosphate ion content is below 5% w/w, or an equivalent concentration of another anion, shows excellent lustre, covering power and pearliness and is a preferred white pigment of this invention. Because of the relative ease of the control of the reaction when using sodium sulphide as the sulphiding reagent, it is possible to make pigments which are coloured by light interference. Various interference colours can be obtained by varying the duration of the sulphiding treatment and the concentration and amount of the sulphiding solution. At any stage, the reaction can be stopped by rapid filtration and by washing the product with water. Alternatively, sufficient sulphide ions need only be added to take the reaction to a completion at a particular colour, thus obviating the need for a means of rapid filtration.

Table I shows the approximate quantity of sodium sulphide nonahydrate which has to be added to 29 g. of zinc orthophosphate of typical size 150$\mu$ × 40$\mu$ × 1½$\mu$ to produce the colours specified.

TABLE I

| Colour observed | Weight of $Na_2S.9H_2O$ per 29 g. zinc orthophosphate (grams) |
| --- | --- |
| Pale yellow | 80 |
| Copper | 93 |
| Purple | 96 |
| Blue | 100 |
| Green | 106 |
| Yellow | 108 |
| Red | 111 |
| Pale purple | 116 |
| Pale blue | 123 |

The colours observed at normal incidence in reflection on a film are determined partially by reinforcement (constructive interference) of light of wavelengths ($4nd/2N-1$), but mainly by destructive interference of light of wavelength $2nd/N$), where N is a positive integer, $n$ is the refractive index of a layer and d is its thickness; n.d= optical thickness. The resulting variation of colour with increasing film thickness is given by Newton's scale of colours. In effect, by varying the sulphiding treatment, one can vary the reflectivity of the crystal; unless the sulphiding treatment is complete one has, in effect, a multi- or three-layer structure. Thus in the course of the sulphiding reaction, when the optical thickness of the sulphide layers reaches a quarter wavelength dimension for a particular wavelength of visible light the pigment will become coloured. Where particularly strong colours are required it is important to maintain in the crystals a central unchanged portion which, in itself, has a suitable optical thickness to reinforce the reflection from the two adjoining sulphide layers, i.e. the three layers should have the same optical thickness. In particular the strongest colour will be produced by those platelets whose dimensions are correct for producing coloured effects by destructive interference of light. Normally the optical thickness of the sulphide layers will be in the region of 35–350 m$\mu$ and the optical thickness of the original template crystal will be in the region of 50–10,000 m$\mu$.

FIGS. I–II illustrate sections through typical platelets whose layer thicknesses are correct for reflecting red and yellow light respectively produced by the constructive interference of light. FIGS. III and IV illustrate sections through typical platelets whose layer thicknesses are correct for reflecting red and yellow light respectively produced by the destructive interference of light. In these Figures, there is a central unchanged zinc orthophosphate layer sandwiched between two sulphided layers. It can be seen that for maximum reflectivity it is important to utilise in the sulphiding reaction crystals of a different thickness for each particular colour to be reinforced. Table II gives suitable thicknesses for zinc orthophosphate crystals of refractive index 1.62 and with adjoining sulphide layers of average refractive index 1.9, for producing products coloured by the constructive and destructive interference of light.

It should be noted, as mentioned earlier, that the strongest colours are those produced by the destructive interference of light, and the dimensions quoted in Table II for the products which are coloured by this effect are preferred coloured products of this invention.

It has been found that the minimum quantity of sodium sulphide required to give the full range of colours from pale yellow, yellow to copper to red to red-purple and purple at 23° C., is about 10 grams of nonahydrate per 4 grams of the zinc orthophosphate, having a crystal size of $150\mu \times 40\mu \times 1\frac{1}{2}\mu$. Larger quantities of sulphide reduce the reaction time for the formation of colours and with extended reaction times some second order interference colours can be produced. It has also been found that as the concentration of the sulphide ion is increased, so the time taken to produce the colours is reduced. Again, the rate of formation of colours is greatly increased with an increase in temperature. Thus, at 10° C. the reaction may not proceed further than the yellow stage after 140 minutes but at 50° C. the complete range of colours can be produced in only 30 minutes.

It is to be appreciated, however, that it is possible to effect substantially total replacement of anions to give a crystal having a uniform high refractive index; the optical effects are then confined to those of a single thin layer of film and those between adjacent crystals, as in the case of natural pearl essence. It should be noted that, at least with respect to zinc orthophosphate of thickness greater than 250 m$\mu$ and prepared without recourse to surface active agents, and then reaction with sulphide ions, that total replacement of anions gives rise to crystals which tend to be weak physically and to crumble. Naturally these are less suitable for use as pearling agents. Zinc orthophosphate crystals of thicknesses less than 250 m$\mu$ and prepared in the presence of an anionic suitable surface active agent can however be treated with sulphide ions to produce complete replacement of phosphate ions without affecting the desirable properties of the crystal. This product is a preferred white pigment of the present invention and shows admirable nacreous properties in a variety of matrices.

It should be noted that in some preparations of the sulphided pigment, the product shows reactivity towards oxygenated compounds in a similar fashion to the chemical properties of sodium sulphide. This unwanted property is usually accompanied by a pale pink colour exhibited by the product in bulk. Both of these latter defects can be eliminated by stirring the sulphided product with weak acid or buffer, typically a 1.4% w/v solution of acetic acid which stabilises and eliminates or reduces unwanted colour in the product.

According to another embodiment of the invention, the sulphiding treatment is carried out under non-aqueous conditions or under gaseous conditions i.e. hydrogen sulphide can be passed over the dry crystals. Apart from sodium sulphide, ammonium sulphide and other alkali metal sulphides and hydrosulphides, compounds which will form hydrogen sulphide under alkaline conditions such as thiourea can also be used.

The precise nature of the sulphided product is not known with any certainty but sulphide ions replace the anions in the crystal lattice, since total replacement of anion by sulphide ions can be shown by conventional analysis. In any event, the sulphide ions do not cause the planar shape of the original zinc salt to be altered. It is thought that the completely converted product is formed of a mass of crystallites of zinc sulphide, each having a zinc blende-type structure.

It is possible to prepare oxide-containing crystals by treating the zinc salt, for example zinc orthophosphate, with an aqueous solution of a base or salt such as sodium carbonate to convert part or all of the crystal to a basic zinc carbonate or hydroxide and then to convert this carbonate or hydroxide to oxide by heating. Accordingly, the present invention also provides a process for preparing nacreous pigments which comprises heating planar or plate-like particles of a zinc salt which has been treated with a carbonate or hydroxide, suitably at about 125° C. in the case of a hydroxide and at about 300° C. in the case of a carbonate. Heating of the sulphided zinc materials and oxide containing zinc materials, e.g. at temperatures up to about 350° C., drives off water and may be associated with some loss of mechanical strength. Heating the sulphided and oxide-containing zinc materials at temperatures up to at least 700° or 750° C., however, may increase the mechanical strength of the crystals and also produces a rise in refractive index. Furthermore, at temperatures of about 600° C. and above some of the zinc sulphide is converted to zinc oxide by oxidation when heated in the presence of oxygen, typically air, so that the final product contains oxide ions in place of part or all of the sulphide ions. Sulphided manganese materials may also be heated at similar temperatures to raise their refractive index, but care must be taken to avoid oxidation.

The pearling agents and decorative products of the present invention can be used in a variety of ways to produce products having a pearly and/or decorative effect. Thus the pigments of the present invention can be incorporated into plastics and cosmetic preparations as well as the other substances in which known pearling agents have been used. In particular, a pearly or nacreous effect is produced when the pigments of the present invention are compounded and cast into a polyvinyl chloride resin, an acrylic resin, a polyester resin, or into lacquer films of cellulose nitrate or acetate. Furthermore, pearly make-up compositions can be produced.

The following examples further illustrate the present invention. Examples 1 to 7 and 14 illustrate the preparation of salt used to prepare the final sulphided salt.

EXAMPLE 1

Water (4 liters) and gelatin (2 g) are heated with stirring to 90° C. Phosphoric acid (d 1.75; 18 ml) is added followed by ammonia solution (d 0.880; 33 ml). The temperature of the solution is raised to 97° C and zinc chloride (55.6g) in water (150 ml) is added. The suspension of zinc phosphate so produced is cooled rapidly to room temperature (3–4 minutes) with continuous stirring. The solid material is allowed to settle (ca.15 minutes) when most of the supernatant liquid can be decanted. The residue is then filtered off, washed well with water and stored as a wet paste.

EXAMPLE 2

Preparation of pearly zinc ortho phosphate of very large particle size (100 – 1000$\mu$; 0.1 – 1mm diameter).

Water (4 liters) is heated to 90° C and phosphoric acid (d 1.75; 18 ml) is added, followed by ammonia solution (d 0.880; 33ml), with brisk stirring. The temperature of the solution is raised to 97° C and zinc chloride (55.6g) in water (150ml) is added. The suspension of zinc phosphate so produced is kept at 70°–80° C for 2 hours, after which time the product is cooled, filtered, washed well with water and stored as a wet paste.

EXAMPLE 3

Preparation of pearly zinc orthophosphate of large particle size (30–100$\mu$; 0.03–0.1 mm diameter; 1–2$\mu$ thickness).

This material is prepared in an identical manner to that described in Example 2 except that the reaction mixture is not maintained at 70°–80° C for 2 hours, but cooled to 20° C in about 4 minutes as soon as the zinc chloride solution has been added. This material has a typical analysis of:

| Zinc | (Zn) | 44.7% |
| --- | --- | --- |
| Phosphate | (PO$_4$) | 44.3% |
| Ammonium | (NH$_4$) | negligible |
| Loss in weight at 300° C | | 10.5% |
| Loss in weight on ignition | | 10.7% |

The refractive index of this material (Na light) is 1.61–1.63.

EXAMPLE 4

Preparation of pearly zinc orthophosphate of medium crystal size (50$\mu$; 0.05mm average particle size).

The preparation is identical to Example 3 except that the reaction mixture is cooled to room temperature in 2 minutes.

EXAMPLE 5

Preparation of pearly zinc orthophosphate of small crystal size (approximately 30$\mu$ × 8$\mu$ × 1$\mu$ thick).

Zinc orthophosphate (600 g) is mixed with a small quantity of water and micronised using a "Silverson" macerator of the type in which an impeller blade rotates close to the inside surface of a preforated container. These seed crystals are added to a solution of disodium hydrogen phosphate 12H$_2$O (8kg) in water (120 liters). This solution is heated to 85° C and added over a period of 5 minutes to a solution of zinc sulphate 7H$_2$O (6kg) in water (120 liters) at 85° C, with constant stirring. The precipitated zinc orthophosphate is allowed to settle and most of the supernatant liquid removed by decanting. Some of the residual water is removed from the precipitate by spinning in a cloth bag. 4.8 kg of pearly zinc orthophosphate is obtained and stored as a damp paste.

EXAMPLE 6

Preparation of pearly zinc orthophosphate in the presence of an anionic surface active agent.

Manoxol OT (2g; sodium 2(ethyl hexyl) sulphosuccinate) is dissolved in water (4 liters) at 50° C. Phosphoric acid (18 ml; d 1.75) is added to this solution followed by ammonia solution (33ml; d 0.880). The temperature of the solution is raised to 95° c. and a solution of zinc chloride (56g) in water (150 ml) added with brisk stirring. The white precipitate is stirred and cooled to room temperature in 10 to 30 minutes. The product, which is very silvery and highly pearlescent is separated by centrifuging the suspension at 1,500–1,800 r.p.m. decanting the supernatant liquid and washing the residue four times with 0.1% aqueous Manoxol solution by stirring, centrifuging and decanting. The product which has approximate dimensions of 16$\mu$ ×8$\mu$ × 80$\mu$ is stored as a paste wet with Manoxol OT solution. Yield 56.2g paste assayed as 22.5g dry pigment = 41% yield based on zinc used. Loss on ignition 12.6%; Zn 44.2%; PO4 ≡ 42.7%.

If the quantity of Manoxol OT used in this example is changed to a quantity of 1.5 g or 2.5 g. the following approximate particle dimensions will be obtained:

1.5g 23$\mu$ × 10$\mu$ × 200$\mu$ thick 2.5g 19$\mu$ × 8$\mu$ × 80$\mu$ thick (similar to the product obtained using 2 g. of Manoxol OT)

EXAMPLE 7

Preparation of pearly zinc orthophosphate in the presence of an anionic surface active agent (Nansa HS; sodium dodecylbenze sulphonate).

The preparation is identical to Example 6 except 1.5g Nansa HS flake is substituted for the 2.0g aliquot of Manoxol OT.

EXAMPLE 8

The damp zinc orthophosphate prepared in Example 1 is re-suspended in water (200 ml) containing a few drops of ammonium sulphide solution. The suspension is stirred well and 8% ammonium sulphide solution (5 ml) in water (30 ml) is added dropwise over a period of 15 minutes. After the whole of the ammonium sulphide solution has been added the suspension is stirred for a further 5 minutes. The product is filtered off and washed thoroughly with water. The pigment is then dehydrated by washing with isopropanol and stored as a damp paste.

Yield 58g, as a paste assayed at 55% solids (=32g dry pigment). The overall yield is approximately 50% based on zinc chloride. This product shows considerably increased lustre and opacity in lacquers compared with untreated zinc orthophosphate.

EXAMPLE 9 pearly zinc orthophosphate as prepared in Example 2 (12g of a 33% paste in water) is added to a solution of sodium sulphide nonahydrate (10g) in water (157ml), and the suspension stirred at 23° c for 40 minutes. The silvery product was noticeably more lustrous than the starting material and was filtered and washed thoroughly with water and dried at 110° C.

A typical analysis for this product is:

| Zinc | (Zn) | 48.2% |
| --- | --- | --- |
| Phosphate | (PO$_4$) | 41.1% |
| Sulphide | (S) | 3.85% |

If the reaction is allowed to continue beyond the time indicated in this Example the following typical colour changes are noted:

| Number of minutes from start of reaction | Colour of Pigment |
| --- | --- |
| 50 | Pale Yellow |
| 67 | Yellow |
| 74 | Copper. [Typical analysis Zn = 50.9% ; $PO_4$ = 31.0% S = 9.6.%.] |
| 77 | Red |
| 80 | Red-Purple |
| 83 | Purple |

The reaction can be stopped at any of the colour stages by rapid filtration, and by washing the product with cold water.

In various experiments the quantity of sodium sulphide used was varied from 8 to 18 grams per 4 grams of zinc orthophosphate (equivalent to 12 grams of 33 % paste). The minimum quantity of sodium sulphide nonahydrate required to give the full range of colours described above at 23° C was 10 grams, when the crystal size was in the region of 30–100$\mu$ diameter.

In other experiments quantities of sodium sulphide nonahydrate (10g) as solutions of concentrations varying from 3–12% by weight per volume in water were used to treat 4 gram samples of zinc orthophosphate. The reaction follows the same basic pattern as in the previous experiments but the time taken for the colours to appear was progressively reduced as the concentration of the solution was increased.

In further experiments using 10 grams of sodium sulphide nonahydrate as a 6% weight per volume aqueous solution to treat 4 gram samples of zinc orthophosphate, the reaction temperature was varied from 10° to 70° C the temperature of each reaction being maintained at ± ½° C in this range. The rate of formation of the colours was greatly increased with increasing temperature. Thus at 10° C after 140 minutes the reaction would not proceed further than the yellow stage, but at 50 ° C the complete range of colours had been produced in 30 minutes.

EXAMPLE 10

The preparation of a "second colour" pigment.

Pearly zinc orthophosphate as prepared in Example 2 (12g of a 33% paste) is suspended in a solution of sodium sulphide nonahydrate (10 g) in water (157ml) and the suspension stirred at a temperature of 20° C. The following colour sequences were noted:

| Number of minutes from start of reaction | Colour observed |
| --- | --- |
| 48 | Yellow |
| 57 | Orange |
| 60 | Red |
| 69 | Purple |
| 75 | Blue |
| 80 | Yellow |
| 86 | Red |
| 88 | Purple |
| 93 | Blue |
| 98 | Green |

The reaction mixture is filtered rapidly at this stage and the pigment washed thoroughly with water.

EXAMPLE 11

Preparation of a calcined product.

A sample of the silvery product obtained in Example 10 is heated in air to 250° C for 1 hour. The material is then transferred to an electric furnace and heated in air at 750° C for 1½ hours. The product has increased lustre compared with a sample which had not been calcined, judged visually with the samples dispersed in a cellulose nitrate film. The mechanical strength of the calcined product is also considerably improved, thus rendering the pigment less likely to be degraded on handling or when blended, for example, into a cosmetic composition.

EXAMPLE 12

Preparation of a high quality white pearling agent.

Pearly zinc orthophosphate (56.2g wet paste = 22.5g pigment) prepared as in Example 6 is suspended in Manoxol OT solution (150ml; 0.1% w/v solution) and added to a solution of sodium sulphide nonahydrate (60g) in water (1350ml) and the suspension stirred briskly at room temperature for 2¼ hours. The product is separated by centrifuging at 1500–1800 r.p.m. and decanting the supernatant liquid. The pigment is washed three times with 200 ml portions of 0.1% w/v Manoxol OT solution by stirring, centrifuging and decanting. The product is stabilised by suspending it in a stirred solution of glacial acetic acid (22ml) in water (1500ml) for 45 minutes. The product is separated by centrifuging, and washed twice with water. The material can be dehydrated by washing with alcohol and then n butyl alcohol, and the resulting paste, when cast into a nitrocellulose film, exhibits a high lustre with excellent opacity.

A typical analysis of this product is as follows:

| | | |
| --- | --- | --- |
| Zinc | (Zn) | 58.7% |
| Sulphide | (S) | 27.5% |
| Phosphate | ($PO_4$) | negligible |
| Loss in weight at 300° C | | 8.9% |

EXAMPLE 13

The use of sodium hydrosulphide (NaSH) as a sulphiding agent.

The preparation is identical to Example 12 except 20g of sodium hydrosulphide is used in place of sodium sulphide nonahydrate.

EXAMPLE 14

Preparation of pearly manganese orthophosphate.

A solution of manganese sulphate ($MnSO_4$ $5H_2O$; 16.1g) in water (150ml) is added dropwise over one hour to a stirred cold solution containing ammonia solution (d 0.880; 14ml) and phosphoric acid (d 1.75; 4.5ml) in water (400ml). A pale pink product is obtained which exhibits a pearly lustre.

EXAMPLE 15 pearly manganese orthophosphate prepared as in Example 14 is suspended in a 3% w/v solution of sodium sulphide nonahydrate. After 30 minutes the product becomes noticeably more lustrous and only a very pale pink in colour. The product is separated by filtration and washed well with water.

EXAMPLE 16 pearly zinc orthophosphate as prepared in Example 2 (29g) is added to anhydrous sodium carbonate (45g) dissolved in water (1500ml) and the suspension stirred at room temperature for 2 hours. The product is filtered off and washed thoroughly with water and dried in an oven at 120° C. The dry powder is placed in a crucible and heated in a furnace at 700° C for 3/4 hour. The product, when incorporated into a cellulose nitrate lacquer film, shows increased lustre and opacity when compared with an untreated sample of zinc orthophosphate dispersed in a similar fashion.

TABLE II

| Wavelength of light $m\mu$ | Constructive interference | | | | |
|---|---|---|---|---|---|
| | Colour observed by | | thickness of center layer of crystal $m\mu$ | thickness of sulphide layer $m\mu$ | thickness of crystal for optimum reinforcement $m\mu$ |
| | reflection | transmission | | | |
| U.V. up to ca 380 | white | white | 58 | 50 | 158 |
| 450 | blue | yellow | 69 | 59 | 187 |
| 510 | green | red | 79 | 67 | 213 |
| 550 | yellow | blue | 85 | 72 | 230 |
| 640 | red | green | 99 | 84 | 267 |

| Wavelength of light $m\mu$ | Destructive interference | | | | |
|---|---|---|---|---|---|
| | Colour observed by | | thickness of centre layer of crystal $m\mu$ | thickness of sulphide layer $m\mu$ | thickness of crystal for optimum reinforcement $m\mu$ |
| | reflection | transmission | | | |
| U.V. up to ca 380 | white | white | 117 | 100 | 317 |
| 450 | yellow | blue | 139 | 118 | 375 |
| 510 | red | green | 157 | 134 | 425 |
| | blue | yellow | 170 | 145 | 460 |
| 640 | green | red | 197 | 169 | 535 |

The following Examples illustrate the preparation of basic zinc salts as templates.

EXAMPLE 17

An aqueous solution (200 ml) of zinc nitrate heptahydrate (148 g) is heated to boiling with stirring and zinc oxide (4g) is added steadily until no further dissolution occurs. Boiling is continued for a further five minutes, and the hot solution is then filtered to remove undissolved zinc oxide. The filtrate is allowed to cool to rrom temperature whilst stirring at 200 r.p.m. After cooling, the precipitated basic zinc nitrate is filtered off, washed three times with distilled water and resuspended in aqeuous "Manoxol OT" (0.15%) or ethanol for storage. Elemental analysis shows the product to be $Zn(NO_3)_2.5[Zn(OH)_2]2H_2O$.

Under the microscope the product can be seen to consist of platy crystals and aggregates of platy crystals. The individual crystals mostly have diameters in the range 5–30$\mu$ and thicknesses of 150–550 $\mu$, belong to the orthorhombic or monoclinic system and are typically lozenges with edge angles 84° ± 1° and 96° ± 1° or irregular hexagons with edge angles 96° ± 1° and 132° ± 1°. The crystals are birefringent with extinction directions in the plane of the late bisecting the 84° and 96° angles, with the refractive indices parallel to these directions being 1.54 and 1.64 respectively. The aggregates are of thicknesses up to 1$\mu$ and diameters up to 90 , as giving the appearance of a glitter or coarse pearl effect to the suspension; after treatment with ultrasonics the aggregates are dispersed and the product consists of broken crystals mostly of diameter 3–15$\mu$ and thickness 150 to 500 $\mu$. This product displays a lustrous pearl effect.

EXAMPLE 18

An aqueous solution (200 ml) of zinc sulphate heptahydrate (144 g) is heated to boiling and zinc oxide (8 g) is stirred in. The solution is boiled for 5 minutes and the hot solution is then filtered to remove undissolived zinc oxide. The filtrate is allowed to cool to room temperature with stirring at 200 r.p.m. After cooling, the product is filtered off, washed with distilled water and suspended in aqueous "Manoxol OT" (0.15%) or ethanol for storage. The individual crystals are regular triangular plates with edge angles 60° or irregular hexagonal plates, edge angles 120°. The plane of each crystal plate contains the basal section, the refractive index of which is 1.57. The crystals have diameters of 15 to 20$\mu$ and thicknesses 200 to 900 $\mu$, and the aggregates have diameters of 20 to 80$\mu$ with thicknesses of 0.4 to 16 $\mu$. After treatment with ultrasonics, a lustrous but rather coarse pearly suspension is obtained, the individual crystals of which have diameters of 10 to 20 $\mu$ and thickness 200 to 900 $\mu$ although some aggregates are still present.

Elemental analysis shows the product to be $ZnSO_4.3[Zn(OH)_2]$.

EXAMPLE 19

An aqueous solution (200 ml) of zinc chloride ($ZnCL_2$: 140 g) is heated to boiling and zinc oxide (4g) is stirred in. The solution is boiled for 5 minutes and the hot solution filtered to remove undissolved oxide. The filtrate is allowed to cool whilst stirring at 200 r.p.m. After cooling, the basic salt is filtered off, washed thoroughly with distilled water and suspended in aqueous "Manoxol OT" (0.15%) or ethanol. The individual crystals of the product are hexagonal plates, edge angles 120°. The plane of each crystal plate contains the basal section, the refractive index of which is 1.63. The material is badly aggregated, but after treatment with ultrasonics the aggregates are dispersed, and the suspension consists of crystals with diameters predominantly 5 to 25 $\mu$, thickness 200 to 450 $\mu$. Elemental analysis shows the product to be $ZnCl_2.4[Zn(OH)_2]$.

EXAMPLE 20

An aqueous solution (200 ml) of zinc bromide ($ZnBr_2$ : 112 g) is heated to boiling and zinc oxide (4 g) stirred in. The suspension is boiled for 5 minutes and the hot solution is filtered to remove undissolved zinc oxide. The filtrate is allowed to cool to room temperature whilst stirring at 200 r.p.m. After cooling, the basic salt is filtered off, washed thoroughly with distilled water and stirred as a suspension in aqueous "Manoxol OT" (0.15%) or in ethanol.

Elemental analysis shows the product to be $ZnBr_24[Zn(OH)_2]$.

The resulting suspension displays a glitter or coarse pearl effect due to the presence of aggregates. After treatment with ultrasonics, the aggregates are dispersed and the resulting suspension shows an improved pearl effect. The individual crystals belong to the hexagonal system, the plane of each plate containing the basal section. The refractive index in the plane of the plate is 1.66. Most of the crystals have diameters of 2–15 $\mu$ and thicknesses of 90 to 450 $\mu$.

The following Examples 21 to 23 illustrate further methods of preparing basic zinc salts, suitable as templates for sulphiding. The formula and refractive index were the same as in the preceding Examples for the same salt. Examples 24 to 27 illustrate the sulphiding process.

EXAMPLE 21

An aqueous solution (200 ml) of zinc bromide ($ZnBr_2$ : 56 g) is heated to boiling and 1N sodium hydroxide (24ml) is run in. The flocculent white precipitate redissolves slowly on boiling (about 5 minutes) and the solution is allowed to cool to room temperature whilst stirring at 200 r.p.m. The resulting pearly precipitate is filtered off, washed thoroughly with distilled water and stored as a suspension in "Manoxol OT" (0.15%) or ethanol. After treatment with ultrasonics the suspension gives a lustrous pearl effect. The individual crystals consist of broken and irregular platelets with diameters mostly in the range 2 to 10 $\mu$ and thicknesses of 50 to 170 $\mu$.

EXAMPLE 22

An aqueous solution (200 ml) of zinc nitrate heptahydrate (148 g) is heated to boiling and 1N sodium hydroxide (5 ml) is run in. The flocculent precipitate redissolves after boiling for about 5 minutes; the volume of the solution is then made up to 200 ml. The solution is allowed to cool to room temperature whilst stirring at 200 r.p.m. The pearly crystals are filtered off, washed thoroughly with distilled water and suspended is aqueous "Manoxol OT" for storage.

After treatment with ultrasonics, the product has a good pearly appearance. The individual crystals are mostly irregular platelets of diameter 3 to 16$\mu$ and thickness 50 to 140 $\mu$, although some aggregates are still present with thicknesses up to 2$\mu$.

EXAMPLE 23

An aqueous solution (200 ml) of zinc bromide ($ZnBr_2$ : 60 g) is boiled, and sufficient 1N sodium hydroxide is added to produce a slight turbidity. Basic zinc bromide is then precipitated by running in distilled water (1 l) with stirring over a period of ½ hour whilst maintaining the temperature at 90°–95° C. The solution is maintained at 90°–95° c. for further 15 minutes and is then allowed to cool, with stirring at 200 r.p.m., to room temperature. The precipitate is washed with distilled water and transferred to aqueous "Manoxol OT" (0.15%) or ethanol for storage.

The product is improved by treatment with ultrasonics, and the pigments display glitter, coarse pearl or soft pearl effects dependent on the time of treatment with ultra-sonics. When the size of the crystal aggregates has been reduced to 4 to 21$\mu$ in diameter by 60–500 $\mu$ thick, the resulting suspension displays a good pearl effect.

EXAMPLE 24

An aqueous solution (100 ml) of sodium sulphide ($Na_2S.9H_2O$ : 24 g) is added to an aqueous suspension (100 ml) of the pearly basic zinc bromide (2 g) of Example 21. The mixture is stirred at 200 r.p.m. and heated to 60° ± 5° C. After 2 hours the solution is allowed to cool and the product is washed with distilled water by centrifuging and decantation. The particles of the sulphided material retain the crystal form and dimensions of the basic zinc bromide, but have a refractive index of 1.87. A good pearl product is obtained when the suspension is treated with ultrasonics to break up the aggregates.

EXAMPLE 25

Proceeding as in Example 24, pearly basic zinc chloride of Example 19 is treated with sodium sulphide to give a pearly product with refractive index 1.81.

EXAMPLE 26

An aqueous solution (100 ml) of sodium sulphide nonahydrate (24g) is added to an aqueous "Manoxol OT" suspension of pearly basic zinc nitrate e.g. of EXAMPLE 17. The mixture is stirred for 2 hours at room temperature, after which the product is thoroughly washed with distilled water by centrifuging and decantation, and transferred to isopropanol for storage.

It should be noted that the temperature used depends on the particular salt although, of course, the operation should take place over a convenient time period.

The particles of the sulphided product retain the crystal form and dimensions of the basic zinc nitrate template but have a refractive index of 1.8. Treatment with ultrasonics produces a pearly product.

EXAMPLE 27

In a similar manner to Example 26, pearly basic zinc sulphate is sulphided to give a product of refractive index 1.82. After treatment with ultrasonics to disperse the aggregates a pearly product is obtained, which however has a pale pink tinge.

Similar results can be obtained using the other templates.

The basic zinc salt templates of Examples 17 to 23 exhibit pearly or glitter effects in aqueous suspension but have insufficiently high refractive indices to be of use as pearling or glitter agents.

I claim

1. Essentially plate-like particles of a zinc or manganese salt consisting essentially of the ion of the salt and: (i) sulphide ions or (ii) in the case of zinc salts, sulphide and oxide ions, or (iii) in the case of zinc salts, oxide ions.

2. A zinc salt according to claim 1 containing orthophosphate ions.

3. A salt according to claim 2 containing at least about 2 by weight of sulphide ions, and/or, about 2 to about 12% by weight of oxide ions.

4. A salt according to claim 3 containing about 2 to about 20% by weight of sulphide ions.

5. A salt according to claim 3 containing about at least 20% by weight of sulphide ions.

6. A salt according to claim 1 which has a particle size from 1 micron to 2 mm. across.

7. A salt according to claim 6 which has a particle size from 5 to 50 microns across.

8. A salt according to claim 1 having a particle length to the thickness ratio from 15 to 1000:1.

9. A salt according to claim 8 having a particle length to thickness ratio from 40 to 400:1.

10. A salt according to claim 9 having a particle length to thickness ratio from 100 to 400:1.

11. A salt according to claim 1 having a particle thickness from 50 to 100 $\mu$.

12. A salt according to claim 11 having a particle thickness from 60 to 100 $\mu$.

13. A salt according to claim 1 having a particle thickness from 100 to 600 $\mu$.

14. A salt according to claim 2 which has a particle thickness less than 250 $\mu$ and contains less than 5% w/w of orthophosphate ion.

15. A salt according to claim 1 containing sulphate ions.

16. A salt according to claim 1 containing chloride ions.

17. A salt according to claim 1 containing bromide ions.

18. A salt according to claim 1 containing nitrate ions.

19. Essentially plate-like particles of a zinc or manganese phosphate salt according to claim 1 in which some of the anions of said salt have been replaced by sulphide ions, the salt containing at least about 2% by weight of sulphide ions, or (i), in the case of a zinc salt, at least about 2% by weight of sulphide ions and at least about 2% by weight of oxide ions, or (iii) in the case of a zinc salt about 2 to 12% by weight of oxide ions.

20. Essentially plate-like particles of zinc orthophosphate according to claim 1 containing at least about 2% by weight of sulphide ions, the particles being 16 to 23 microns across, 8 to 10 microns wide and 80 to 200 millimicrons thick.

* * * * *

UNITED STATES PATENT OFFICE
CERTIFICATE OF CORRECTION

Patent No. 3,992,219      Dated November 16, 1976

Inventor(s) David William Harold CLARK

It is certified that error appears in the above-identified patent and that said Letters Patent are hereby corrected as shown below:

Column 10, line 11, "80µ" should be --80mµ--;
           line 18, "200µ" should be --200mµ--;
           line 19, "80µ" should be --80mµ--;
Column 13, line 58, "550" should be --550 mµ;
           line 67, "90, as" should be --90µ, thus--;
Column 14, line 3, "500µ" should be --500mµ--;
           line 44, "900µ" should be --900mµ--;
Column 15, line 1, "450µ" should be --450mµ--;
           line 24, "450µ" should be --450mµ--;
           line 45, "170µ" should be --170mµ--;
           line 60, "140µ" should be --140mµ--;
Column 16, line 11, "500µ" should be --500mµ--;
Claim 11, line 2, "100µ" should be --100mµ--;
Claim 12, line 2, "100µ" should be --100mµ--;
Claim 13, line 2, "600µ" should be --600mµ--.

Column 14, line 49, "900µ" should be --900mµ--.

Signed and Sealed this

Tenth Day of May 1977

[SEAL]

Attest:

RUTH C. MASON
*Attesting Officer*

C. MARSHALL DANN
*Commissioner of Patents and Trademarks*